United States Patent
Huang et al.

(10) Patent No.: US 11,864,027 B2
(45) Date of Patent: Jan. 2, 2024

(54) EHT STA CONFIGURED FOR TRANSMISSION OF A CONTROL RESPONSE FRAME FOR RATE SELECTION

(71) Applicant: Intel Corporation, Santa Clara, CA (US)

(72) Inventors: Po-Kai Huang, San Jose, CA (US); Daniel F. Bravo, Hillsboro, OR (US); Robert J. Stacey, Portland, OR (US); Danny Ben-Ari, Hasharon Hatichon (IL); Danny Alexander, Neve Efraim Monoson (IL); Arik Klein, Givaat Shmuel (IL); Xiaogang Chen, Portland, OR (US); Laurent Cariou, Portland, OR (US); Cheng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 17/232,441

(22) Filed: Apr. 16, 2021

(65) Prior Publication Data
US 2021/0235319 A1 Jul. 29, 2021

Related U.S. Application Data

(60) Provisional application No. 63/013,155, filed on Apr. 21, 2020, provisional application No. 63/011,429, filed on Apr. 17, 2020.

(51) Int. Cl.
*H04W 28/06* (2009.01)
*H04L 1/00* (2006.01)
*H04W 84/12* (2009.01)

(52) U.S. Cl.
CPC .......... *H04W 28/06* (2013.01); *H04L 1/0003* (2013.01); *H04L 1/0009* (2013.01); *H04W 84/12* (2013.01)

(58) Field of Classification Search
CPC .... H04W 28/06; H04W 84/12; H04L 1/0009; H04L 27/2602; H04L 1/0003; H04L 5/0053
See application file for complete search history.

(56) References Cited

U.S. PATENT DOCUMENTS 11,109,278 B2 * 8/2021 Verma ............... H04W 72/0446
2016/0330047 A1 * 11/2016 Seok ................... H04B 7/0617
(Continued)

*Primary Examiner* — Chandrahas B Patel
(74) *Attorney, Agent, or Firm* — Schwegman Lundberg & Woessner, P.A.

(57) ABSTRACT

An extremely high-throughput (EHT) station (STA) is configured for transmission of a control response frame for rate selection. In response to a frame carried in an EHT PPDU soliciting a control response frame, the EHT STA may calculate a duration of a non-HT PPDU containing the control response frame sent at a primary rate, The EHT STA may also encode a high-efficient (HE) single-user (SU) PPDU (HE SU PPDU) for transmission to carry the solicited control response frame when a transmit time of the encoded HE SU PPDU is less than the calculated duration of the non-HT PPDU, or encode an EHT PPDU for transmission to carry the solicited control response frame when a transmit time of the encoded EHT PPDU is less than the calculated duration of the non-HT PPDU. A reduction in overhead may be achieved by using an HE SU PPDU or an EHT PPDU instead of a non-HT PPDU to carry a solicited control response frame.

19 Claims, 7 Drawing Sheets

(56) References Cited

U.S. PATENT DOCUMENTS

2021/0014811 A1* 1/2021 Seok ................. H04W 74/0816
2021/0037550 A1* 2/2021 Park ................... H04W 74/006
2021/0281357 A1* 9/2021 Verma ................. H04L 1/0013

* cited by examiner

EHT STA CONFIGURED FOR TRANSMISSION OF A CONTROL RESPONSE FRAME FOR RATE SELECTION

PRIORITY CLAIMS

This application claims priority under 35 USC 119 to U.S. Provisional Patent Application Ser. No. 63/013,155, filed Apr. 21, 2020, and U.S. Provisional Patent Application Ser. No. 63/011,429, filed Apr. 17, 2021, which are incorporated herein by reference in their entireties.

TECHNICAL FIELD

Embodiments pertain to wireless communications. Some embodiments relate to wireless local area networks (WLANs) configured in accordance with one of the IEEE 802.11 standards. Some embodiments relate to control response physical layer (PHY) protocol data unit (PPDU) format and rate selection in extremely high-throughput (EHT) WLANs. Some embodiments relate to multi-user (MU) transmission.

BACKGROUND

One issue with communicating data over a wireless network is rate selection. In extremely high throughput (EHT) networks, a EHT physical layer (PHY) protocol data unit (PPDU) may be used to solicit responses. Allowing a non-HT PPDU response is natural, but consideration should be made to how to do reference rate mapping for a non-HT PPDU in response to soliciting PPDU with 4K quadrature amplitude modulation (QAM). Second, there is a question if a HE single user (SU) PPDU control response may be allowed in response to an EHT PPDU. Third, since a HE SU PPDU cannot transmit with a 320 MHz bandwidth, there is a question on how to respond in 320 MHz to an EHT PPDU using a PPDU that is not a non-HT PPDU or an HE PPDU. Finally, access points (AP) and STAs may have a power imbalance. Currently, depending on the setting of BSSBasicRate set. The STA may use the same rate as the soliciting PPDU, which may not be received by the AP due to this power imbalance. The AP may need to drop the rate of transmission to allow the STA to transmit a control response with lower rate. This problem exists for STAs that follows the baseline rule.

DETAILED DESCRIPTION

Figure 1:
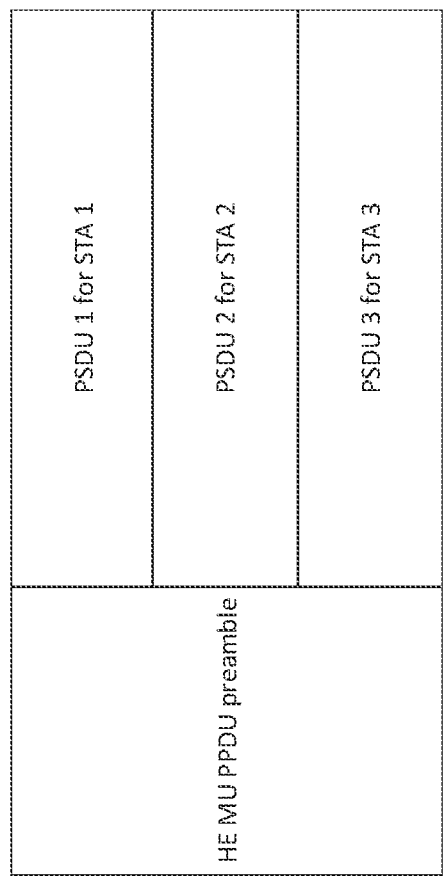
FIG. 1 illustrates an HE MU PPDU for transmission of multiple PSDUs in one PPDU in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to an extremely high-throughput (EHT) station (STA). In some of these embodiments, the EHT STA may be configured for transmission of a control response frame for rate selection. In these embodiments, in response to a frame carried in an EHT PPDU soliciting a control response frame, the EHT STA may calculate a duration of a non-HT PPDU containing the control response frame sent at a primary rate. The EHT STA may also encode a high-efficient (HE) single-user (SU) PPDU (HE SU PPDU) for transmission to carry the solicited control response frame when a transmit time of the encoded HE SU PPDU is less than the calculated duration of the non-HT PPDU, or encode an EHT PPDU for transmission to carry the solicited control response frame when a transmit time of the encoded EHT PPDU is less than the calculated duration of the non-HT PPDU. In these embodiments, a reduction in overhead may be achieved by using an HE SU PPDU or an EHT PPDU instead of a non-FIT PPDU to carry a solicited control response frame.

In some embodiments, the EHT STA may encode a non-FIT PPDU for transmission to carry the solicited control response frame when the transmit time of the encoded HE SU PPDU would not be less than the calculated duration of the non-HT PPDU. In some embodiments, the EHT STA may encode a non-HT PPDU for transmission to carry the solicited control response frame when the transmit time of the encoded EHT PPDU would not be less than the calculated duration of the non-HT PPDU. In these embodiments, when a reduction in overhead cannot be achieved by using an HE SU PPDU or an EHT PPDU, a non-HT PPDU is used to carry the solicited control response frame.

In some embodiments, when either an EHT' PPDU or an HE SU PPDU are transmitted to carry the solicited control response frame, the EHT STA may to encode the EHT PPDU or the HE SU PPDU to have a coding rate lower than a coding rate of the EHT PPDU soliciting the control response frame, a modulation and coding scheme (MCS) index lower than an MCS index of the EHT PPDU soliciting the control response frame, a number of spatial streams (NSS) that is less than a NSS of the EHT PPDU soliciting the control response frame. In these embodiments, the EHT STA may use a control response frame for rate selection based on additional rules set by the soliciting station (i.e., based on the EHT PPDU soliciting the control response frame).

In some embodiments, for transmission the EHT PPDU or the HE SU PPDU, the EHT STA may select a highest MCS index that is lower than the MCS index of the EHT PPDU soliciting the control response frame, and select a highest NSS that is less than the NSS of the EHT PPDU soliciting the control response frame. In these embodiments, the modulation and coding rate are included in the selected MCS index.

In some embodiments, the EHT STA may decode the frame carried in the EHT PPDU soliciting the control response frame. The frame carried in the EHT PPDU soliciting the control response frame may comprise one of a control frame, a data frame, and a management frame.

In some embodiments, the frame carried in the EHT PPDU soliciting the control response frame comprises a data or control frame soliciting a block acknowledgement (BA). In these embodiments, the EHT STA may calculate a duration of a non-HT PPDU containing the BA sent at a primary rate, and either encode an HE SU PPDU for transmission to carry the solicited BA when a transmit time of the HE SU PPDU is less than the calculated duration of the non-HT PPDU, or encode an EHT PPDU for transmission to carry the solicited BA when a transmit time of the EHT PPDU is less than the calculated duration of the non-HT PPDU.

In some embodiments, for transmission of the EHT PPDU, the EHT STA may encode the EHT PPDU for transmission of up to a 320 MHz bandwidth. For transmission of the HE SU PPDU, the EHT STA may encode the HE SU PPDU for transmission of up to a 160 MHz bandwidth.

In some embodiments, if the EHT PPDU soliciting the control response frame is received within a 6 GHz band, the EHT STA may cause the EHT STA to transmit the EHT PPDU or the HE SU PPDU carrying the solicited control response frame in the 6 GHz hand.

In some embodiments, the primary rate is a highest rate in the BSSBasicRateSet parameter that is less than or equal a non-HT reference rate or a highest mandatory rate. In these embodiments, the primary rate may be defined in accordance with IEEE P802.11-REVmd/D2.4, August 2019.

In some embodiments, when the transmit times the HE SU PPDU and the EHT PPDU are both less than the calculated duration of the non-HT PPDU, the EHT STA may encode the HE SU PPDU for transmission to carry the solicited control response frame and refrain from encoding an EHT PPDU for transmission to carry the solicited control response frame, although the scope of the embodiments is not limited in this respect. In these embodiments, an HE SU PPDU for transmission is chosen to carry the solicited control response frame.

In some embodiments, when the transmit times the HE SU PPDU and the EHT PPDU are both less than the calculated duration of the non-HT PPDU, the EHT STA may encode the EHT PPDU for transmission to carry the solicited control response frame and refrain from encoding a HE SU PPDU for transmission to carry the solicited control response frame, although the scope of the embodiments is not limited in this respect. In these embodiments, an EHT PPDU for transmission is chosen to carry the solicited control response frame.

Some embodiments are directed to non-transitory computer-readable storage medium that stores instructions for execution by an high-throughput (EHT) station (STA).

Some embodiments are directed to an EHT STA, that in response to a data frame carried in an EHT PPDU soliciting a block acknowledgement (BA), the EHT STA may calculate a duration of a non-HT PPDU containing the BA sent at a primary rate and either encode a high-efficient (HE) single-user (SU) PPDU (HE SU PPDU) for transmission to carry the BA when a transmit time of the encoded HE SU PPDU is less than the calculated duration of the non-HT PPDU, or encode an EHT PPDU for transmission to carry the BA when a transmit time of the encoded EHT PPDU is less than the calculated duration of the non-HT PPDU. In these embodiments, for transmission of the EHT PPDU, the EHT STA may encode the EHT PPDU for transmission of up to a 320 MHz bandwidth, and for transmission of the HE SU PPDU, the EHT STA may encode the HE SU PPDU for transmission of up to a 160 MHz bandwidth.

There has been no previous solution for rate selection for EHT consideration. There is proposal on responding EHT PPDU when the soliciting PPDU is EHT PPDU. There is a proposal in the IEEE 802.11ah draft standard to negotiate MCS difference for power imbalance. There is no discussion on corresponding rate selection when responding with EHT PPDU. There is no discussion on corresponding rate selection when responding with HE SU PPDU. The 11ah solution for MCS difference does not work for non-HT because non-HT does not have MCS and only has data rate.

Example embodiments of the present disclosure relate to systems, methods, and devices for control response PPDU format and rate selection.

In one embodiment, a control response PPDU format system may allow HE SU PPDU or EHT PPDU of control response solicited by EHT PPDU.

For the rate selection of HE SU PPDU of control response solicited by EHT PPDU:
  The duration of the HE SU PPDU may be smaller than the duration of non-HT or non-HT duplicate PPDU response.

For the rate selection of EHT PPDU of control response solicited by EHT PPDU:
  The duration of the EHT PPDU may be smaller than the duration of non-HT or non-HT duplicate PPDU response.

Further details are provided below.

In one embodiment, a control response PPDU format system may label non-HT rate and negotiate upper bound or rate label difference for the MCS response:
  Rate selection of non-HT PPDU of control response solicited by EHT PPDU with 4 k QAM is now defined.
  Rate selection of HE SU PPDU of control response solicited by EHT PPDU is now defined.
  Rate selection of EHT PPDU of control response solicited by EHT PPDU is now defined.
  Power imbalance of AP and STA can be resolved to allow higher DL rate with lower UL control response rate.

In one or more embodiments, a control response PPDU format system may facilitate control response PPDU format selection. Based on the following texts, if a control response is not a response to RTS frame, then the control response is carried in non-HT PPDU. Note that STBC frame is basically not used. Further, control response like BA does not contain HT control field.

The following rules determine whether a Control frame is carried in a non-HT, HT or VHT PPDU:
  a) A control response frame shall be carried in an HT PPDU when the Control frame is a response to a frame that meets any of the following conditions:
    1) The frame eliciting the response included an HT variant HT Control field with the TRQ field equal to 1 and the HT NDP Announcement subfield equal to 0, and this responder set the Implicit Transmit Beamforing Receiving Capable field to 1 in its last transmitted HT Capabilities element; or
    2) The frame eliciting the response was an RTS frame carried in an HT PPDU; or
    3) The frame eliciting the response was an STBC frame, and the Dual CTS Protection field was equal to 1 in the last HT Operation element received from its AP or transmitted by the STA (see 10.3.2.10 (Dual CTS protection)).
b) A Control frame may be carried in an HT PPDU when the Control frame meets any of the following conditions:
1) The Control frame contains an HT variant HT Control field with the MRQ subfield equal to 1, or
2) The Control frame contains an HT variant HT Control field with the TRQ field equal to 1.
c) A Control frame may be carried in a VHT PPDU when the Control frame contains an HT Control field.
d) A Control frame shall be carried in an HT PPDU or a VHT PPDU when the Control frame is sent using an STBC frame.
e) A control response frame shall be carried in a VHT PPDU if the eliciting frame was an RTS frame carried in a VHT PPDU that contains an HT Control field with MRQ subfield equal to 1.

Otherwise, the Control frame shall be carried in a non-HT PPDU. The requirements specified in 10.31 (Sounding PPDUs), 10.32.2 (Link adaptation using the HT variant HT Control field), and 10.34 (Transmit beamforming) further constrain the choice of non-HT, HT, or VHT PPDU.

In IEEE802.11ax, the following rule was introduced to allow HE ER SU PPDU to send control response or HE SU PPDU if the soliciting PPDU is HE SU PPDU or HE MU PPDU in 6 GHz.

A Control frame sent by an HE STA as a response to an HE ER SU PPDU that does not contain a Trigger frame or frame carrying a TRS Control field should be carried in an HE ER SU PPDU unless the most recently received PPDU sent by a recipient of the HE ER SU PPDU to the HE STA after association was not an HE ER SU PPDU in which case the Control frame should be carried in non-HT PPDU.

A Control frame sent by an HE STA as a response to an HE SU PPDU or a non-HT PPDU that does not contain a Trigger frame or frame carrying a TRS Control field should be carried in a non-HT PPDU unless the most recently received PPDU sent by a recipient of the HE SU PPDU to the HE STA after association was an HE ER SU PPDU in which case the Control frame should be carried in an HE ER SU PPDU A Control frame sent in the 6 GHz band as a response to an HE SU PPDU or HE MU PPDU, and that is not carried in HE TB PPDU, may be carried in an HE SU PPDU if the transmit time of HE SU PPDU is less than or equal to the PPDU duration of a non-HT PPDU containing the Control frame sent at the primary rate (see 10.6.6.5.2 (Selection of a rate or MCS)).

Control response rate selection:
When the control response is carried in non-HT PPDU, the rule is shown below.
10.6.6.5 Rate selection for control response frames
Selection of a rate or MCS:
If a CTS or Ack frame is carried in a non-HT PPDU, the primary rate is defined to be the highest rate in the BSSBasicRateSet parameter that is less than or equal to the rate (or non-HT reference rate; see 10.6.11 (Non-HT basic rate calculation)) of the previous frame. If no rate in the BSSBasicRateSet parameter meets these conditions, the primary rate is defined to be the highest mandatory rate of the attached PHY that is less than or equal to the rate (or non-HT reference rate; see 10.6.11 (Non-HT basic rate calculation)) of the previous frame. The STA may select an alternate rate according to the rules in 10.6.6.5.4 (Selection of an alternate rate or MCS for a control response frame). The STA shall transmit the non-HT PPDU CTS or Ack frame at either the primary rate or the alternate rate, if one exists.

If a BlockAck frame is sent as an immediate response to either an Implicit BAR request (#1415-Ed) or to a BlockAckReq frame that was carried in an HT or VHT PPDU and the BlockAck frame is carried in a non-HT PPDU, the primary rate is defined to be the highest rate in the BSSBasicRateSet parameter that is less than or equal to the rate (or non-HT reference rate; see 10.6.11 (Non-HT basic rate calculation)) of the previous frame. If no rate in the BSSBasicRateSet parameter meets these conditions, the primary rate is defined to be the highest mandatory rate of the attached PHY that is less than or equal to the rate (or non-HT reference rate; see 10.6.11 (Non-HT basic rate calculation)) of the previous frame. The STA may select an alternate rate according to the rules in 10.6.6.5.4 (Selection of an alternate rate or MCS for a control response frame). The STA shall transmit the non-FIT PPDU BlockAck frame at either the primary rate or the alternate rate, if one exists.

If a Compressed BlockAck frame is sent as an immediate response to a BlockAckReq frame that was carried in a non-HT PPDU and the Compressed BlockAck frame is carried in a non-HT PPDU, the primary rate is defined to be the highest rate in the BSSBasicRateSet parameter that is less than or equal to the rate (or non-HT reference rate; see 10.6.11 (Non-HT basic rate calculation)) of the previous frame. If no rate in the BSSBasicRateSet parameter meets these conditions, the primary rate is defined to be the highest mandatory rate of the attached PHY that is less than or equal to the rate (or non-HT reference rate; see 10.6.11 (Non-HT basic rate calculation)) of the previous frame. The STA may select an alternate rate according to the rules in 10.6.6.5.4 (Selection of an alternate rate or MCS for a control response frame). The STA shall transmit the non-HT PPDU Compressed BlockAck frame at either the primary rate or the alternate rate, if one exists.

The non-HT reference rate is calculated by the following table.

TABLE 10-10

Non-HT reference rate

| Modulation | Coding rate (R) | Non-HT reference rate (Mb/s) |
|---|---|---|
| BPSK | ½ | 6 |
| BPSK | ¾ | 9 |
| QPSK | ½ | 12 |
| QPSK | ¾ | 18 |
| 16-QAM | ½ | 24 |
| 16-QAM | ¾ | 36 |
| 64-QAM | ½ | 48 |
| 64-QAM | ⅔ | 48 |
| 64-QAM | ¾ | 54 |
| 64-QAM | ⅚ | 54 |
| 256-QAM | ¾ | 54 |
| 256-QAM | ⅚ | 54 |
| 1024-QAM | ¾ | 54 |
| 1024-QAM | ⅚ | 54 |

Further, non-FIT mandatory rate is 6, 12, or 24 Mbps.
When the control response is carried in an HE SU PPDU, the rule is shown below.
If a control response frame is transmitted in an HE SU PPDU or HE MU PPDU, the channel width (CH_BANDWIDTH parameter of the TXVECTOR) shall be selected first according to 10.6.6.6 (Channel Width selection for Control frames), and then the <HE-MCS, NSS> tuple shall be selected from a set of <HE-MCS, NSS> tuples called the CandidateMCSSet. The CandidateMCSSet is defined in 10.6.6.5.3 (Control response frame MCS computation) except that the set additionally contains the <HE-MCS, NSS> tuples for an HE STA.

CandidateMCSSet is defined in 10.6.6.5.3 as follows.

10.6.6.5.3 Control response frame MCS computation:

(11ah) For non-S1G STAs, if none of the above conditions is true, the CandidateMCSSet is the union of the Basic HT-MCS Set field of the HT Operation parameter of the MLME-START.request primitive or Basic HT-MCS Set field of the HT Operation parameter of the SelectedBSS parameter of the MLME-JOIN.request primitive and the basic VHT-MCS and NSS set. If the frame eliciting the response was an RTS frame carried in a VHT PPDU, then the CandidateMCSSet may additionally include the <VHT-MCS, NSS> tuple with the same MCS and number of spatial streams as the VHT PPDU. If the combined Basic HT-MCS Set field of the HT Operation parameter of the MLME-START.request primitive or Basic HT-MCS Set field of the HT Operation parameter of the SelectedBSS parameter of the MLME-JOIN.request primitive is empty, the CandidateMCSSet shall consist of:

The set of mandatory HT PHY MCSs if the STA eliciting the response is an HT STA that is not a VHT STA.

The set of mandatory HT-MCSs(#2446) plus the set of <VHT-MCS(#2446), NSS> tuples corresponding to the mandatory VI-IT PHY MCSs with NSS=1 if the STA eliciting the response is a VHT STA.

Essentially, for HE, the CandidateMCSSet includes the Basic HE-MCS Set field of the HE Operation parameter or the set of mandatory HE PHY MCSs.

To select the right MCS and NSS, the NSS needs to be smaller than the NSS of the soliciting frame, the MCS needs to be smaller than the MCS of the soliciting frame and the coding rate needs to be smaller than the coding rate of the soliciting frame. Then the highest NSS and MCS in the CandidateMCSSet may be selected for <HE-MCS, NSS> tuple.

It may be started with the proposal for rate selection of non-HT PPDU control response solicited by EHT PPDU. Expand table 10-10 by having 4096-QAM mapped to non-HT reference rate 54 Mbps. The coding rate can be ¾ or ⅚ for 4096-QAM mapping.

It may be continued with rate selection rule of EHT PPDU control response solicited by EHT PPDU:
  Limit the option to 6 GHz band.
  The duration of EHT PPDU response shall not be longer than the duration of non-HT PPDU or non-HT duplicate PPDU.
  The coding rate is smaller than the coding rate of the soliciting PPDU.
  The MCS index is smaller than the MCS index of the soliciting PPDU.
  The NSS is smaller than the NSS of the soliciting PPDU.
  The <EHT MCS, NSS> tuple is in Basic EHT-MCS and NSS set or is a mandatory rate supported by EHT STA when Basic EHT-MCS and NSS set is empty.
  Optionally, choose highest MCS and NSS that satisfies the above condition.

It may be continued with rate selection rule of HE SU PPDU control response solicited by EHT PPDU:
  Limit the option to 6 GHz band.
  The duration of HE SU PPDU response shall not be longer than the duration of non-HT PPDU or non-HT duplicate PPDU.
  The coding rate is smaller than the coding rate of the soliciting PPDU.
  The MCS index is smaller than the MCS index of the soliciting PPDU.
  The NSS is smaller than the NSS of the soliciting PPDU.
  The <HE MCS, NSS> tuple is in Basic HE-MCS and NSS set or is a mandatory rate supported by HE STA when Basic HE-MCS and NSS set is empty.
  Optionally, choose highest MCS and NSS that satisfies the above condition.

It may be continued with PPDU format selection of control response solicited by EHT PPDU: EHT STA can choose any PPDU format by itself that satisfies the above requirement.

It may be finished with the power imbalance negotiation between two STAs:
  Define control response rate negotiation procedure:
  Request/response frame are defined for this negotiation procedure.
  Action frame can be defined for this purpose.
  11ah action frame may be reused.
  Optionally, the need of response frame may be removed and let the other STA always accept the control response rate negotiation request frame. In the case, the control response rate negotiation request frame can be named control response rate negotiation indication frame.
  Label non-HT rate or non-HT reference rate of Table 10-10 as follows:

| Modulation | Coding Rate (R) | Non-HT reference rate (Mb/s) | Rate Label |
|---|---|---|---|
| BPSK | ½ | 6 | 0 |
| BPSK | ¾ | 9 | 1 |
| QPSK | ½ | 12 | 2 |
| QPSK | ¾ | 18 | 3 |
| 16-QAM | ½ | 24 | 4 |
| 16-QAM | ¾ | 36 | 5 |
| 64-QAM | ½ | 48 | No Label |
| 64-QAM | ⅔ | 48 | 6 |
| 64-QAM | ¾ | 54 | 7 |
| 64-QAM | ⅚ | 54 | 8 |
| 256-QAM | ¾ | 54 | 9 |
| 256-QAM | ⅚ | 54 | 10 |
| 1024-QAM | ¾ | 54 | 11 |
| 1024-QAM | ⅚ | 54 | 12 |
| 4096-QAM | ¾ | 54 | 13 |
| 4096-QAM | ⅚ | 54 | 14 |

Note that 64-QAM with coding rate ½ is not used by HT PPDU, VHT PPDU, or HE PPDU.

The STA that sends the control response rate negotiation request can indicate a rate label in the request frame The rate label indicates the maximum that the STA can send in control response, specifically:

The rate label is generated first based on Table 10-10 to find the non-HT reference rate of the control response frame, and the rate label of non-HT reference rate is based on the described label above. Then the rate label of the control response cannot be higher than the indicated maximum rate label. For non-HT PPDU with rate 54, the rate label is 7. For example, if the rate label of the control response frame is R, then R<=indicated maximum rate label.

This puts a new upper bound on the primary rate selection, and the primary rate selection will be from the highest one in the current set elected for control response rate that is not higher and the rate label.

This puts a new upper bound on the primary MCS selection, and the primary MCS selection will be from the highest one in the current set selected for control response MCS that is not higher than the rate label.

The STA that sends the control response rate negotiation request can indicate a rate label difference in the request frame The rate label difference defines the minimum difference between the rate label of the soliciting frame and the rate label of the response frame. This adds to a new maximum to the primary rate of the control response:

The rate label is generated first based on Table 10-10 to find the non-HT reference rate, and the rate label of non-HT reference rate is based on the described label above.

For non-HT PPDU with rate 54, the rate label is 7.

For example, if the soliciting frame matches a non-HT reference rate based on Table 10-10, then say the rate label of the soliciting frame is S, and the rate label of the control response say R based on the same conversion procedure. Then S-R>= the indicated rate label difference.

TABLE 17-4

Modulation-dependent parameters

| Modulation | Coding rate (R) | Coded bits per subcarrier ($N_{BPSC}$) | Coded bits per OFDM symbol ($N_{CBPS}$) | Data bits per OFDM symbol ($N_{DBPS}$) | Data rate (Mb/s) (20 MHZ channel spacing) | Data rate (Mb/s) (10 MHz channel spacing) | Data rate (Mb/s) (5 MHZ channel spacing) |
|---|---|---|---|---|---|---|---|
| BPSK | ½ | 1 | 48 | 24 | 6 | 3 | 1.5 |
| BPSK | ¾ | 1 | 48 | 36 | 9 | 4.5 | 2.25 |
| QPSK | ½ | 2 | 96 | 48 | 12 | 6 | 3 |
| QPSK | ¾ | 2 | 96 | 72 | 18 | 9 | 45 |
| 16-QAM | ½ | 4 | 192 | 96 | 24 | 12 | 6 |
| 16-QAM | ¾ | 4 | 192 | 144 | 36 | 18 | 9 |
| 64-QAM | ⅔ | 6 | 288 | 192 | 48 | 24 | 12 |
| 64-QAM | ¾ | 6 | 288 | 216 | 54 | 27 | 13.5 |

TABLE 10-10

Non-HT reference rate

| Modulation | Coding rate (R) | Non-HT reference rate (Mb/s) |
|---|---|---|
| BPSK | ½ | 6 |
| BPSK | ¾ | 9 |
| QPSK | ½ | 12 |
| QPSK | ¾ | 18 |
| 16-QAM | ½ | 24 |
| 16-QAM | ¾ | 36 |
| 64-QAM | ½ | 48 |
| 64-QAM | ⅔ | 48 |
| 64-QAM | ¾ | 54 |
| 64-QAM | ⅚ | 54 |
| 256-QAM | ¾ | 54 |
| 256-QAM | ⅚ | 54 |
| 1024-QAM | ¾ | 54 |
| 1024-QAM | ⅚ | 54 |

The draft standard IEEE 802.11ax introduces high efficiency (HE) multi-user (MU) physical layer (PITY) protocol data unit (PPUU) to transmit multiple physical layer convergence procedure service data units (PSDUs) in one PPDU to different associated station devices (STAs) from an access point (AP). Allocation for an PSDU is called a resource unit (RU) in the HE MU PPDU. The indication is provided in HE-SIG-B of the HE MU PPDU preamble. The indicated for the recipient of each RU is provided in 26.11.1 STA_ ID of 26.11 Setting TXVECTOR parameters for an HE PPDU, where a STA_ID is provided for each RU and the STA_ID is set to 11 LSBs of the AID of the STA receiving the PSDU contained in that RU. IEEE802.11ax also introduces the idea of broadcast RU. The PSDU in the broadcast RU is destined to all associated STAs except the STAs that are indicated in other RUs. STA_ID is set to 0 for broadcast.

The draft standard IEEE 802.11ax also expands the idea of broadcast RU to the case when multiple BSSID is supported. Essentially, multiple APs may be collocated to form a multiple BSSID set with one transmitted Beacon. One HE MU PPDU can be transmitted to STAs associated with different APs in one multiple BSSID set.

Further, RUs may be broadcast to different associated STAs in different APs in one multiple BSSID set. Finally, it may possible to have one broadcast RU that destine to all associated STAs of the APs in one multiple BSSID set.

RU for one STA is indicated with STA_ID equal to the 11 LSBs of the AID of the STA Broadcast RUs for associated STAs of one AP excluding the STA indicated by above bullet is indicated with STA_ID equal to BSSID index of the AP. Broadcast RUs for all associated STAs of the APs excluding the STA indicated by above two bullets is indicated with STA_ID equal to 2047. Note that the range of AID assignment from an AP is 1 to 2007. Note that the largest value of STA_ID is 2047.

For a STA that receives a HE MU PPDU with BSS color matches the BSS color of the associated AP, it first checks if there are STA_ID with value matching the 11 LSBs of its AID. If yes, decode. If not, check if there are Broadcast RUs indicating STAs of its associated AP. If yes, decode. If not, check if there are Broadcast RUs indicating STAs of all APs in the multiple BSSID set.

In the draft standard IEEE 802.1 the, one consideration for UL MU is to allow HE STA and EHT STA to transmit UL simultaneously rather than have separate sequence. Allow HE and EHT STA to transmit simultaneously can be achieved with both HE and EHT STA sending HE TB PPDU. Basically, EHT STA is a HE STA, so EHT STA can operate in. HE mode. However, this means that EHT STA cannot use the EHT TB PPDU, which has additional benefits like new modulation and coding scheme.

Now, to trigger EHT TB PPDU, it is expected that quite a lot of additional signaling is required. It is then better to have separate Trigger frame just for EHT STA that solicits UI, EHT TB PPDU, but then there are two Trigger frames and it is a problem to deliver two Trigger frames simultaneously to two different group of STAs, one for HE group and one for ETU group.

Similar problem exists for delivery of Multi-STA BA with both HE and EHT STA sending HE TB PPDU. When there is a new format of Per AID TID info field in multi-STA BA, it cannot be understood by the HE STA. It is possible to design one Trigger frame that solicits HE TB PPDU from HE STA and EHT TB PPDU from EHT STA. It is possible to have multiple Per AID TID info field in multi-STA BA for one TID for a EHT STA to allow backward compatibility.

One common Trigger frame for both HE and EHT STA to solicit different UL TB PPDU format complicates the Trigger frame design. For certain variant of Trigger frame like MU-BAR, the design is impossible. Having multiple Per AID TID info field in multi-STA BA for one TID for a EHT STA increases the overhead. Example embodiments of the present disclosure relate to systems, methods, and devices for EHT UL MU transmission for HE and EHT STAB.

In one embodiment, a EHT UL MU transmission system may facilitate one or more options.

Option 1: The basic idea is to have HE MU PPDU to deliver two Trigger frames, one for HE group and one for EHT group, in different RUs.

Option 2: utilize the idea of having a specialized Trigger frame to change the decoding primary channel of EHT STAs and sending two PPDUs afterwards with two Trigger frames.

Option 3: Aggregate two different Trigger frame in one A-MPDU.

FIGS. 1-6 depict illustrative schematic diagrams for EHT UL MU transmission, in accordance with one or more example embodiments of the present disclosure. In one or more embodiments, a EHT UL MU transmission system may facilitate EHT UL MU transmission.

IEEE 802.11ax introduces HE :MU PPDU to transmit multiple PSDUs in one PPDU to different associated STAs from an AP. The high-level concept is shown in FIG. 1. Note that each allocation for an PSDU is called a resource unit (RU) in the HE MU PPDU. The indication is provided in HE-SIG-B of the HE MU PPDU preamble. The indicated for the recipient of each RU is provided in 26.11.1 STA_ID of 26.11 Setting TXVECTOR parameters for an HE PPDU, where a STA_ID is provided for each RU and the STA_ID is set to 11 LSBs of the AID of the STA receiving the PSDU contained in that RU.

Figure 2:
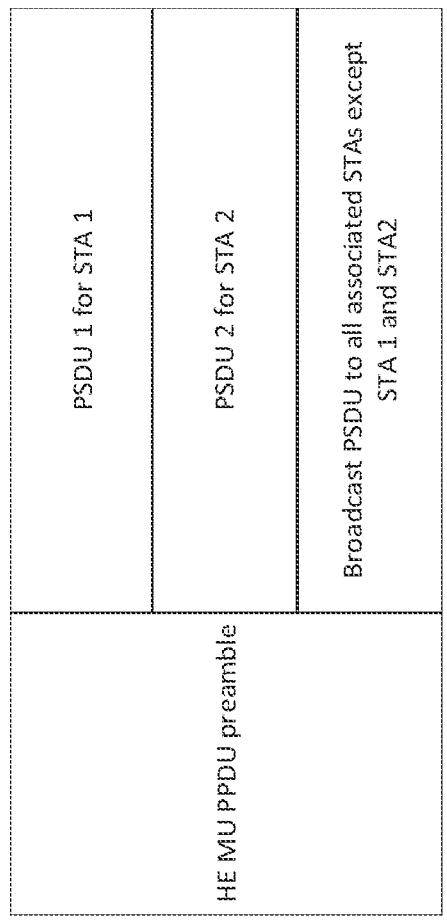
FIG. 2 an HE MU PPDU for transmission of multiple PSDUs in one PPDU including a broadcast PSDU in accordance with some embodiments.

IEEE 802.11ax also introduces the idea of broadcast RU. The PSDU in the broadcast RU is destined to all associated STA.s except the STAs that are indicated in other RUs. STA_ID is set to 0 for broadcast. This is illustrated in FIG. 2

IEEE 802.11ax also expands the idea of broadcast RU to the case when multiple BSSID is supported. Essentially, multiple APs may be collocated to form a multiple BSSID set with one transmitted Beacon. One HE MU PPDU can be transmitted to STAs associated with different APs in one multiple BSSID set. Further, broadcast RUs may be used to different associated STAs in different APs in one multiple BSSID set. Finally, one broadcast RU may be used that destine to all associated STAs of the APs in one multiple BSSID set.

RU for one STA is indicated with STA_ID equal to the 11 LSBs of the AID of the STA. Broadcast RUs for associated STAs of one AP excluding the STA indicated by above bullet is indicated with STA_ID equal to BSSID index of the AP. Broadcast RUs for all associated STAs of the APs excluding the STA indicated by above two bullets is indicated with STA_ID equal to 2047. Note that the range of AID assignment from an AP is 1 to 2007. Note that the largest value of STA_ID is 2047.

For a STA that receives a HE MU PPDU with BSS color matches the BSS color of the associated AP, it first checks if there are STA_ID with value matching the 11 LSBs of its AID. If yes, decode. If not, check if there are Broadcast RUs indicating STAs of its associated AP. If yes, decode. If not, check if there are Broadcast RUs indicating STAs of all APs in the multiple BSSID set.

Figure 3:
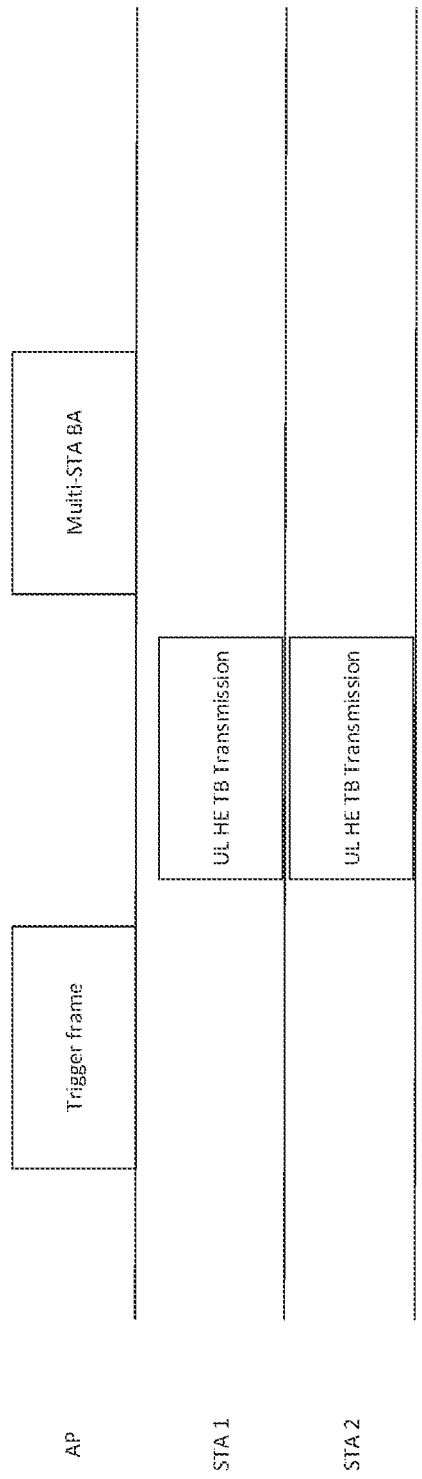
FIG. 3 illustrates an IEEE 802.11ax uplink (UL) multiuser (MU) sequence in which HE STAs simultaneously transmit trigger based PPDUs in response to a trigger frame, in accordance with some embodiments.
Figure 4:
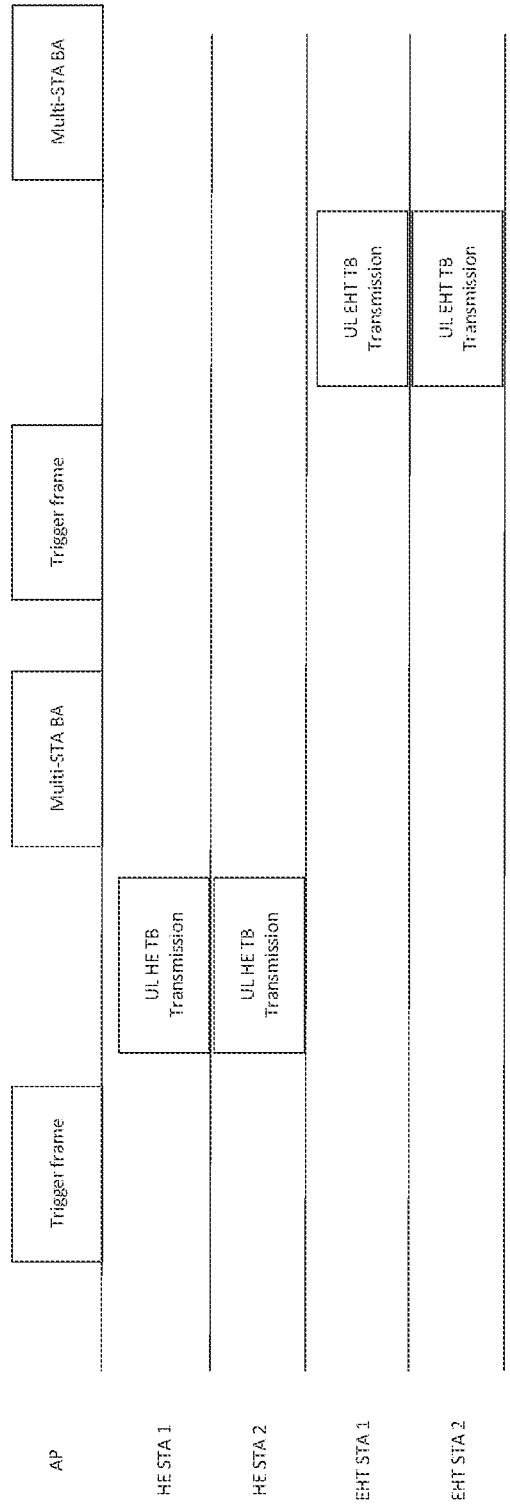
FIG. 4 illustrates separate UL MU sequences for HE and EHT STAs for transmission of trigger based PPDUs in accordance with some embodiments.
Figure 5:
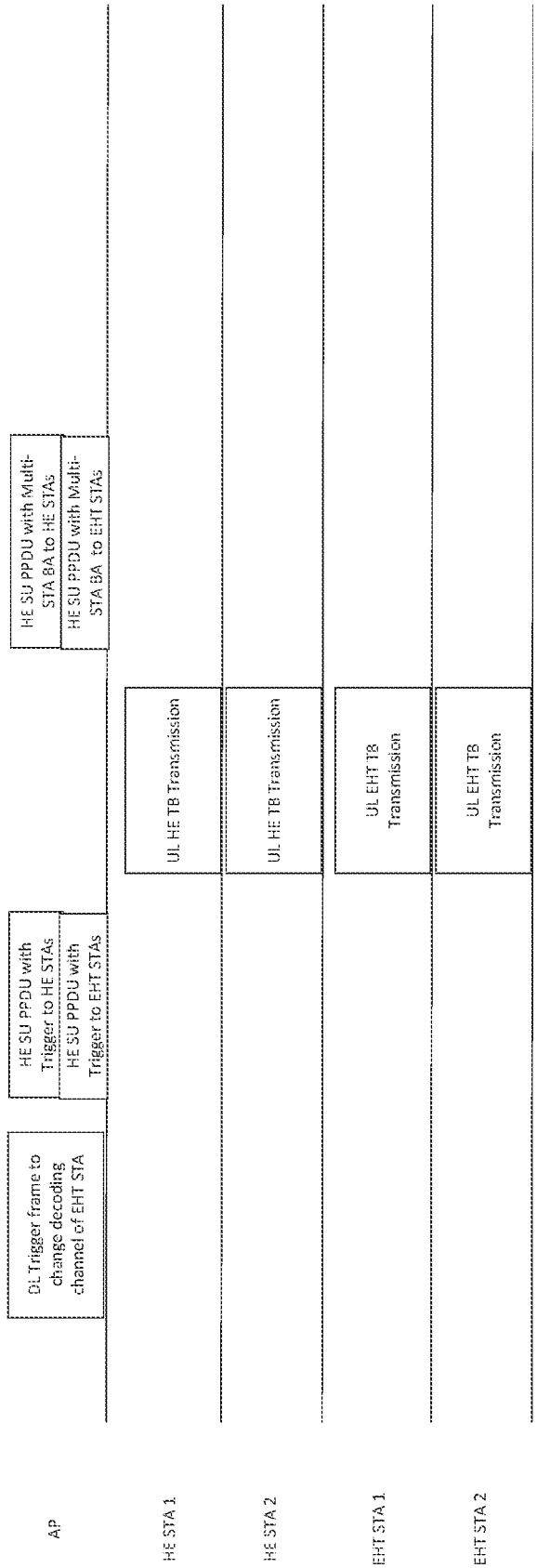
FIG. 5 illustrates the use of a specialized trigger frame to change the decoding primary channel of EHT STAs and the sending two PPDUs afterwards with two trigger frames in accordance with some embodiments.

The draft standard IEEE 802.11ax introduce UL MU mechanism. The sequence is shown in FIG. 3. In the draft standard IEEE 802.11be, one consideration for UL MU is to allow HE STA and EHT STA to transmit UL simultaneously rather than have separate sequence like FIG. 4. Allow HE and. EHT STA to transmit simultaneously can be achieved with both HE and EHT STA sending HE TB PPDU. Basically, EHT STA is a HE STA, so EHT STA can operate in HE mode. However, this means that EHT STA cannot use the EHT TB PPDU, which has additional benefits like new modulation and coding scheme.

Now, to trigger EHT TB PPDU, it is expected that quite a lot of additional signaling is required. It is then better to have separate Trigger frame just for EITT STA that solicits UI, EHT TB PPDU, two Trigger frames may be used and it is a problem to deliver two Trigger frames simultaneously to two different group of STAs, one for HE group and one for EHT group.

Similar problem exists for delivery of Multi-STA BA with both HE and EHT STA sending HE TB PPDU. When new format are used of Per AID TID info field in multi-STA BA, it cannot be understood by the HE STA.

Option 1: The basic idea is to have HE MU PPDU to deliver two Trigger frames, one for HE group and one for EHT group, in different RU. To achieve this, If multiple BSSID is not implemented, a STA_ID may be added that indicates all associated EHT STA, say STA_ID equal to 2044. Note that 2045 is used to indicate unassociated STA and 2046 is used to indicate unused RU.

If multiple BSSID is implemented, a STA ID may be added that indicates all associated EHT STA of all APs in the multiple BSSID set, say STA_ID equal to 2044. For Triggering purpose, this is enough because multiple BSSID common Trigger may be used, and it is tested in wave 2 HE STA.

If multiple BSSID is implemented, a STA_ID may be used that indicates associated EHT STAs of an AP in the multiple BSSID set, say STA_AID equal to 2008+ BSSID or 2043-BSSID index.

For the processing of EHT STA on HE MU PPDU:

If multiple BSSID is not implemented, not seeing any RU indicates to the EHT STA, seeing EHT broadcast RU, decode. If not seeing EHT Broadcast RU, seeing HE broadcast RU, decode.

If multiple BSSID is implemented, not seeing any RU indicates to the EHT STA, seeing EHT broadcast RU to associated STAs of its AP, decode. If not, seeing EHT broadcast RU to associated STAs of all APs, decode. If not, follow the current HE processing rule.

Option 2: utilize the idea of having a specialized Trigger frame to change the decoding primary channel of EHT STAs and sending two PPDUs afterwards with two Trigger frames. One example is the following, in FIG. 5.

Option 3: Aggregate two different Trigger frame in one A-MPDU.

Two Trigger frames can be delivered simultaneously to HE STAs and EHT STAs for soliciting different TB PPDU format. STA Trigger frame processing is not complicated.

Two multi-STA BAs can be delivered simultaneously to HE STAs and EHTs without the need to use backward compatible design of multi-STA BA.

Option 2 works for the case when it is need to have 320 MHz usage of UL transmission or there are puncturing consideration.

Option 3 allows non-HT or non-HT duplicate PPDU to be sent in the case of 320 MHz or puncturing consideration.

There are two options for the solution.

Option 1: EHT broadcast RU in HE MU PPDU.

STA_ID indication:

If multiple BSSID is not implemented, a STA_ID that indicates all associated EHT STA may be added, say STA_ID equal to 2044. Note that 2045 is used to indicate unassociated STA and 2046 is used to indicate unused RU.

If multiple BSSID is implemented, a STA ID that indicates all associated EHT STA of all APs in the multiple BSSID set may be sent, say STA_ID equal to 2044. For Triggering purpose, this is enough because multiple BSSID common Trigger may be used, and it is tested in wave 2 HE STA.

If multiple BSSID is implemented, a STA_ID may be added that indicates associated EHT STAs of an AP in the multiple BSSID set, say STA_AID equal to 2008+BSSID or 2043-BSSID index.

For the processing of EHT STA on HE MU PPDU:

If multiple BSSID is not implemented, not seeing any RU indicates to the EHT STA, seeing EHT broadcast RU, decode. If not seeing EHT Broadcast RU, seeing HE broadcast RU, decode. Otherwise, do not decode the following RU.

If multiple BSSID is implemented, not seeing any RU indicates to the EHT STA, seeing EHT broadcast RU to associated STAs of its AP, decode. If not, seeing EHT broadcast RU to associated STAs of all APs, decode. If not, follow the current HE processing rule for other RUs.

Option 2: utilize the idea of having a specialized Trigger frame to change the decoding primary channel of EHT STAs and sending two PPDUs afterwards with two Trigger frames.

Send specialized DL Trigger frame to indicate new primary channel for EHT STAs. The indication can different new primary channels for different EHT STAs. Indicate the time for the EHT STA to switch back to the original primary channel.

Send non-HT/non-HT duplicate/HE SU PPDU with Trigger to HE STAs covering primary 20 MHz channel.

Send non-HT/non-HT duplicate/HE SU PPDU/EHT PPDU with Trigger to EHT STAs covering new primary channel indicated by the specialized Trigger frame.

Two Trigger frames have the same transmission duration.

UL TB PPDU sequence.

Send non-HT/non-HT duplicate/HE SU PPDU with Multi-STA BA to HE STAs covering primary 20 MHz channel.

Figure 6:
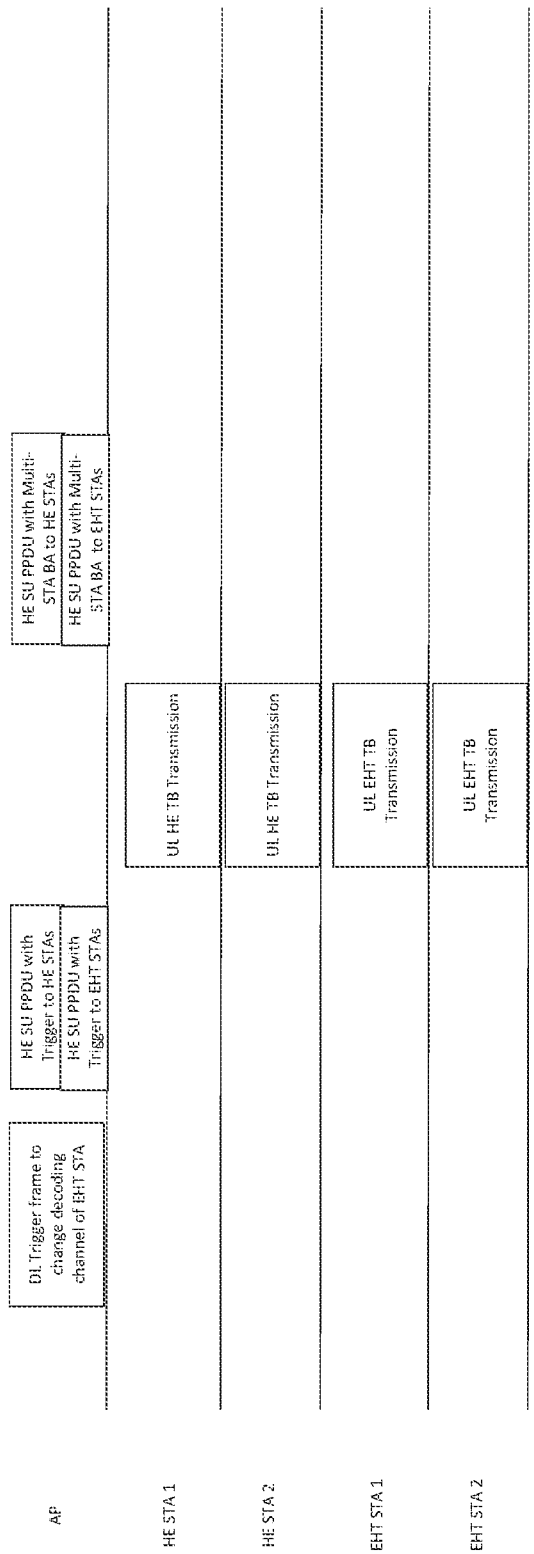
FIG. 6 illustrates sending a non-HT/non-HT duplicate/HE SU PPDU/EHT PPDU with a multi-STA BA to EHT STAs covering a new primary channel indicated by the specialized Trigger frame, in accordance with some embodiments.

Send non-HT/non-HT duplicate/HE SU PPDU/EHT PPDU with Multi-STA BA to EHT STAs covering new primary channel indicated by the specialized Trigger frame. Two multi-STA BAs have the same transmission duration. One example is shown in FIG. 6.

Option 3: Aggregate two different Trigger frame in an A-MPDU.

Any Trigger frame for HE. STAs is in front of any other Trigger frame for EHT STAs. Trigger frame for HE STAs indicate further Trigger frame for EHT STAs is coming so that EHT STAs can skip the processing of the Trigger frame for HE STAs. Trigger frame for HE STAs will not schedule EHT STAs.

It is understood that the above descriptions are for purposes of illustration and are not meant to be limiting.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019 and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 7:
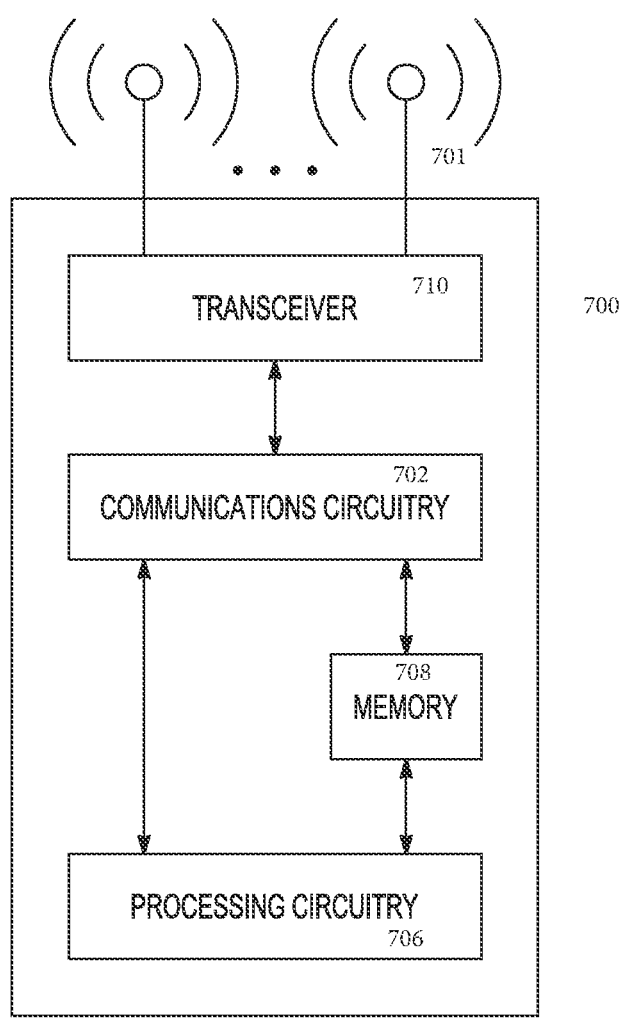
FIG. 7 illustrates a function block diagram of a station (STA) in accordance with some embodiments.

In one embodiment, FIG. 7 illustrates a functional block diagram of a communication station (STA) that may be suitable for use as an AP STA, a non-AP STA or other user device in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an extremely high-throughput (EHT) station (STA), the apparatus comprising: processing circuitry; and memory,
wherein in response to a frame carried in an EHT Multi-User (MU) physical layer conformance procedure (PLCP) protocol data unit (PPDU) (EHT MU PPDU) soliciting a response, the processing circuitry is configured to:
calculate a duration of a non-HT PPDU containing a control response frame sent at a primary rate; and
encode either a high-efficiency (HE) single-user (SU) PPDU (HE SU PPDU) for transmission to carry the control response frame when a transmit time of the encoded HE SU PPDU is less than the calculated duration of the non-HT PPDU or an EHT PPDU for transmission to carry the control response frame when a transmit time of the encoded EHT PPDU is less than the calculated duration of the non-HT PPDU; and
encode a non-HT PPDU for transmission to carry the control response frame when the transmit time of the encoded HE SU PPDU would not be less than the calculated duration of the non-HT PPDU and when the transmit time of the encoded EHT PPDU would not be less than the calculated duration of the non-HT PPDU.

2. An apparatus of an extremely high-throughput (EHT) station (STA), the apparatus comprising: processing circuitry; and memory,
wherein in response to a frame carried in an EHT physical layer conformance procedure (PLCP) protocol data unit (PPDU) soliciting a control response frame, the processing circuitry is configured to:
calculate a duration of a non-HT PPDU containing the control response frame sent at a primary rate; and
encode a high-efficient (HE) single-user (SU) PPDU (HE SU PPDU) for transmission to carry the solicited control response frame when a transmit time of the encoded HE SU PPDU is less than the calculated duration of the non-HT PPDU; or
encode an EHT PPDU for transmission to carry the solicited control response frame when a transmit time of the encoded EHT PPDU is less than the calculated duration of the non-HT PPDU,
wherein the processing circuitry is configured to encode a non-HT PPDU for transmission to carry the solicited control response frame:
when the transmit time of the encoded HE SU PPDU would not be less than the calculated duration of the non-HT PPDU, and
when the transmit time of the encoded EHT PPDU would not be less than the calculated duration of the non-HT PPDU.

3. The apparatus of claim 2, wherein when either an EHT PPDU or an HE SU PPDU are transmitted to carry the solicited control response frame, the processing circuitry is configured to encode the EHT PPDU or the HE SU PPDU to have:
a coding rate lower than a coding rate of the EHT PPDU soliciting the control response frame;
a modulation and coding scheme (MCS) index lower than an MCS index of the EHT PPDU soliciting the control response frame; and
a number of spatial streams (NSS) that is less than a NSS of the EHT PPDU soliciting the control response frame.

4. The apparatus of claim 3, wherein for transmission the EHT PPDU or the HE SU PPDU, the processing circuitry is configured to:
select a highest MCS index that is lower than the MCS index of the EHT PPDU soliciting the control response frame; and
select a highest NSS that is less than the NSS of the EHT PPDU soliciting the control response frame.

5. The apparatus of claim 3, wherein the processing circuitry is configured to decode the frame carried in the EHT PPDU soliciting the control response frame, and
wherein the frame carried in the EHT PPDU soliciting the control response frame comprises one of: a control frame, a data frame, and a management frame.

6. The apparatus of claim 3, wherein the frame carried in the EHT PPDU soliciting the control response frame comprises a data or control frame soliciting a block acknowledgement (BA), and
wherein the processing circuitry is configured to:

calculate a duration of a non-HT PPDU containing the BA sent at a primary rate; and encode an HE SU PPDU for transmission to carry the solicited BA when a transmit time of the HE SU PPDU is less than the calculated duration of the non-HT PPDU; or encode an EHT PPDU for transmission to carry the solicited BA when a transmit time of the EHT PPDU is less than the calculated duration of the non-HT PPDU.

7. The apparatus of claim 6, wherein for transmission of the EHT PPDU, the processing circuitry is configured to encode the EHT PPDU for transmission of up to a 320 MHz bandwidth, and wherein for transmission of the HE SU PPDU, the processing circuitry is configured to encode the HE SU PPDU for transmission of up to a 160 MHz bandwidth.

8. The apparatus of claim 7, wherein if the EHT PPDU soliciting the control response frame is received within a 6 GHz band, the processing circuitry is configured to cause the EHT STA to transmit the EHT PPDU or the HE SU PPDU carrying the solicited control response frame in the 6 GHz band.

9. The apparatus of claim 7 wherein the primary rate is a highest rate in a BSSBasicRateSet parameter that is less than or equal a non-HT reference rate or a highest mandatory rate.

10. The apparatus of claim 3, wherein when the transmit times the HE SU PPDU and the EHT PPDU are both less than the calculated duration of the non-HT PPDU, the processing circuitry is configured to encode the HE SU PPDU for transmission to carry the solicited control response frame.

11. The apparatus of claim 3, wherein when the transmit times the HE SU PPDU and the EHT PPDU are both less than the calculated duration of the non-HT PPDU, the processing circuitry is configured to encode the EHT PPDU for transmission to carry the solicited control response frame.

12. A non-transitory computer-readable storage medium that stores instructions for execution by processing circuitry of an extremely high-throughput (EHT) station (STA), wherein in response to a frame carried in an EHT Multi-User (MU) physical layer conformance procedure (PLCP) protocol data unit (PPDU) (EHT MU PPDU) soliciting a response, the processing circuitry is configured to:

calculate a duration of a non-HT PPDU containing a control response frame sent at a primary rate; and encode a high-efficiency (HE) single-user (SU) PPDU (HE SU PPDU) for transmission to carry the control response frame when a transmit time of the encoded HE SU PPDU is less than the calculated duration of the non-HT PPDU or an EHT PPDU for transmission to carry the control response frame when a transmit time of the encoded EHT PPDU is less than the calculated duration of the non-HT PPDU; and encode a non-HT PPDU for transmission to carry the control response frame when the transmit time of the encoded HE SU PPDU would not be less than the calculated duration of the non-HT PPDU and when the transmit time of the encoded EHT PPDU would not be less than the calculated duration of the non-HT PPDU.

13. A non-transitory computer-readable storage medium that stores instructions for execution by processing circuitry of an extremely high-throughput (EHT) station (STA), wherein in response to a frame carried in an EHT physical layer conformance procedure (PLCP) protocol data unit (PPDU) soliciting a control response frame, the processing circuitry is configured to:

calculate a duration of a non-HT PPDU containing the control response frame sent at a primary rate; and encode a high-efficient (HE) single-user (SU) PPDU (HE SU PPDU) for transmission to carry the solicited control response frame when a transmit time of the encoded HE SU PPDU is less than the calculated duration of the non-HT PPDU; or encode an EHT PPDU for transmission to carry the solicited control response frame when a transmit time of the encoded EHT PPDU is less than the calculated duration of the non-HT PPDU, wherein the processing circuitry is configured to encode a non-HT PPDU for transmission to carry the solicited control response frame:

when the transmit time of the encoded HE SU PPDU would not be less than the calculated duration of the non-HT PPDU, and when the transmit time of the encoded EHT PPDU would not be less than the calculated duration of the non-HT PPDU.

14. The non-transitory computer-readable storage medium of claim 13, where when either an EHT PPDU or an HE SU PPDU are transmitted to carry the solicited control response frame, the processing circuitry is configured to encode the EHT PPDU or the HE SU PPDU to have:

a coding rate lower than a coding rate of the EHT PPDU soliciting the control response frame;

a modulation and coding scheme (MCS) index lower than an MCS index of the EHT PPDU soliciting the control response frame; and a number of spatial streams (NSS) that is less than a NSS of the EHT PPDU soliciting the control response frame.

15. The non-transitory computer-readable storage medium of claim 14, wherein for transmission the EHT PPDU or the HE SU PPDU the processing circuitry is configured to:

select a highest MCS index that is lower than the MCS index of the EHT PPDU soliciting the control response frame; and select a highest NSS that is less than the NSS of the EHT PPDU soliciting the control response frame.

16. The non-transitory computer-readable storage medium of claim 14, wherein the processing circuitry is configured to decode the frame carried in the EHT PPDU soliciting the control response frame, and wherein the frame carried in the EHT PPDU soliciting the control response frame comprises one of: a control frame, a data frame, and a management frame.

17. The non-transitory computer-readable storage medium of claim 14, wherein the frame carried in the EHT PPDU soliciting the control response frame comprises a data or control frame soliciting a block acknowledgement (BA), and wherein the processing circuitry is configured to:

calculate a duration of a non-HT PPDU containing the BA sent at a primary rate; and encode an HE SU PPDU for transmission to carry the solicited BA when a transmit time of the HE SU PPDU is less than the calculated duration of the non-HT PPDU; or encode an EHT PPDU for transmission to carry the solicited BA when a transmit time of the EHT PPDU is less than the calculated duration of the non-HT PPDU.

18. The non-transitory computer-readable storage medium of claim 14, wherein for transmission of the EHT PPDU, the processing circuitry is configured to encode the EHT PPDU for transmission of up to a 320 MHz bandwidth, and wherein for transmission of the HE SU PPDU, the processing circuitry is configured to encode the HE SU PPDU for transmission of up to a 160 MHz bandwidth.

19. An apparatus of an extremely high-throughput (EHT) Access Point station (AP), the apparatus comprising: processing circuitry; and memory, the processing circuitry configured to:

encode for transmission to an EHT station (EHT STA), a frame carried in an EHT Multi-User (MU) Physical-layer Protocol Data Unit (PPDU) (EHT MU PPDU) soliciting a response;

calculate a duration of a non-high-throughput PPDU (non-HT PPDU) containing a control response frame sent at a primary rate; and decode a PPDU carrying the control response frame received from the EHT STA, the received PPDU comprising:

a high-efficient (HE) single-user (SU) PPDU (HE SU PPDU) when a transmit time of the HE SU PPDU would be less than the calculated duration of the non-HT PPDU or an EHT PPDU when a transmit time of the EHT PPDU would be less than the calculated duration of the non-HT PPDU; or a non-HT PPDU when the transmit time of the HE SU PPDU would not be less than the calculated duration of the non-HT PPDU and when the transmit time of the EHT PPDU would not be less than the calculated duration of the non-HT PPDU.

\* \* \* \* \*